Patented Jan. 1, 1935

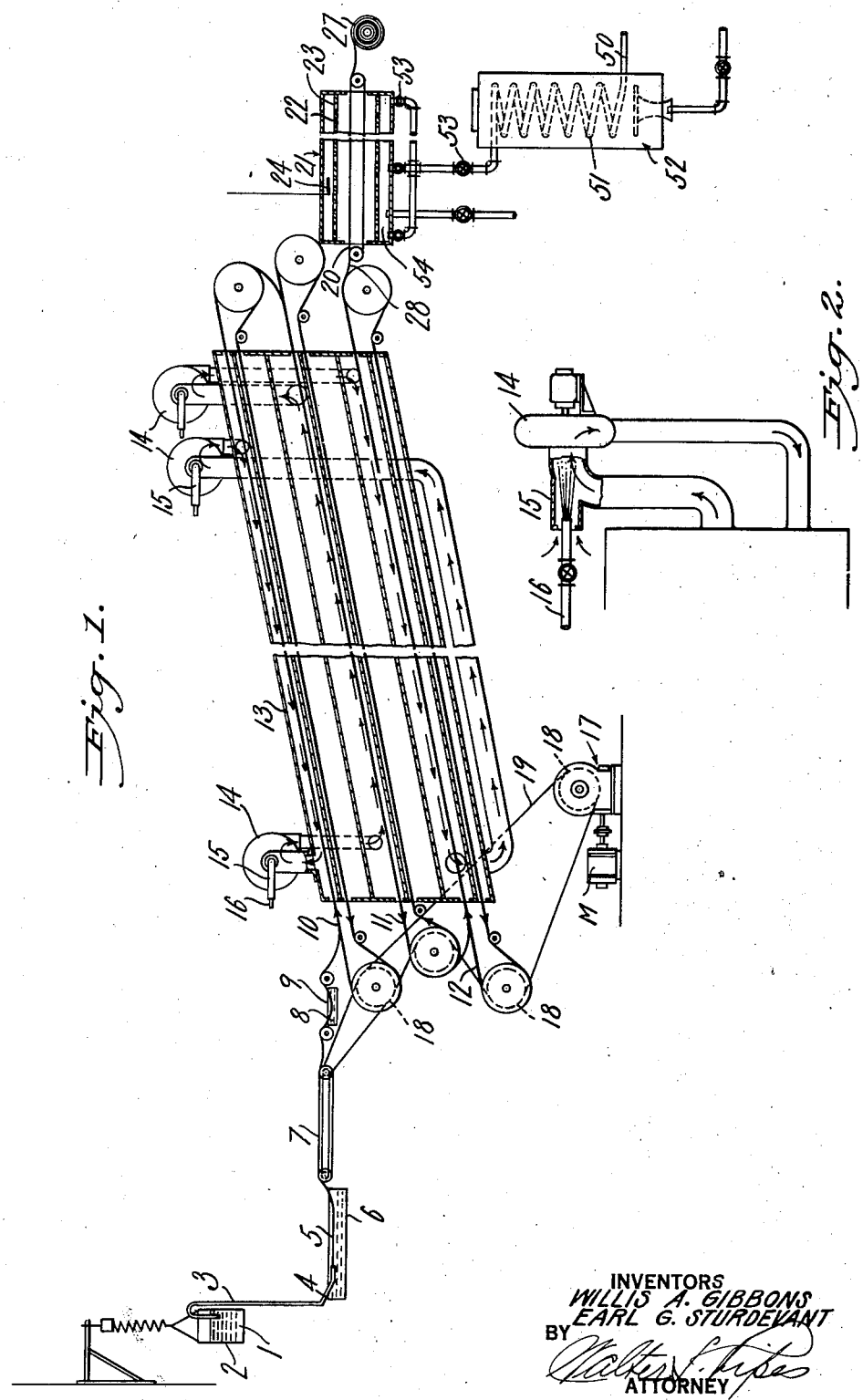

1,986,106

UNITED STATES PATENT OFFICE 1,986,106

PROCESS OF MAKING AN ARTICLE COMPRISING A CONTINUOUS LENGTH OF RUBBER

Willis A. Gibbons, Montclair, and Earl G. Sturdevant, Passaic, N. J., assignors to Revere Rubber Company, Providence, R. I., a corporation of Rhode Island Application March 20, 1931, Serial No. 524,000

6 Claims. (Cl. 18—53)

Rubber sheet material such as thread, sheets, tubing, etc. has been customarily made by milling rubber compounds and then calendering or extruding the same into sheet or tube form, and, in the case of rubber thread or strips, slitting the sheet so made into desired width. Methods of making such materials by streaming or otherwise forming aqueous dispersions of rubber into desired shapes, as for instance in the manner shown in the patents of Ernest Hopkinson and Willis A. Gibbons, No. 1,759,618, patented May 20, 1930, and No. 1,545,257, patented July 7, 1925, have also been devised. These practices have been satisfactory and have been successfully used in the manufacture of rubber products. It is significant, however, that despite the general satisfactory character of previously known methods utilized in the manufacture of rubber materials, most have required a subsequent and separate step in the completion of the product in order to put it in saleable and useable condition. The necessity of this step, which as above indicated, is separate and distinct from the procedure followed in the formation of the product, has involved a breaking up in the continuity of manufacturing operations and added to the cost and difficulty thereof by necessitating extra handling. Moreover such procedure has made necessary the use of heavy vulcanizing apparatus capable of exerting considerable pressure, either mechanical or gaseous, on the product, and at the same time an apparatus capable of simultaneously supplying the proper vulcanizing temperatures to the product.

One of the objects of this invention is to advance the art of rubber manufacture by a new process which enables rubber products to be manufactured continuously without the necessity of breaking the manufacturing operation down into separate and independent steps.

A further object is to provide a process which eliminates the necessity of heavy pressure apparatus in the manufacture of rubber products.

A further object is the production of suitable mechanical instrumentalities for accomplishing the continuous manufacture of rubber articles and the advantages concomitant therewith.

A further object is to shorten the time required for vulcanizing rubber articles in a manner which is extremely rapid, economical and simple of accomplishment and through which a product of outstanding and improved physical properties is produced.

Further objects and advantages of the invention will more clearly appear when reference is had to the following specification and claims.

The invention briefly stated includes the formation of a product, preferably from an aqueous dispersion of rubber or composition thereof, drying or otherwise conditioning the same preparatory to vulcanization, and then, without break in the manufacturing operation, continuously vulcanizing said product as it is fed from the dryer by subjecting it to a heated inert gas which is stable and permanent at atmospheric pressure and at high temperatures. By "gas" we use the term broadly to include vapors such as steam. The degree of heat employed may be made variable to some degree but it is essential that whatever degree is found desirable, it be greater than the normal or usual temperatures at which vulcanization of the same rubber stock would take place if vulcanized according to the usual practice. Upon completion of vulcanization the product may (if in the form of a long filament or sheet) be wound on reels, or handled and packaged as desired preparatory to shipment of the particular rubber article from the factory.

In the drawing:

Fig. 1 is a diagrammatic representation of a group of instrumentalities through which the novel combination of steps herein set out may be accomplished.

Fig. 2 is a side elevation, taken at right angles to Fig. 1, showing the general construction of one of the blowers and heaters for the dryer, and the connections thereto.

As exemplary of the novel method, the following description is given of the steps by which it is utilized in the manufacture of rubber thread:

An aqueous dispersion of rubber 1, which may be intimately intermixed with compounding ingredients in finely divided state, may be supplied to a container 2 arranged so that a constant head of a dispersion of uniform high quality is supplied through siphon 3 to nozzles 4. The quality and uniformity of the material may be obtained by straining or filtering through suitable media. A constant head may be obtained in the manner disclosed in the application of Willis A. Gibbons, Eardley Hazell and Alexis W. Keen, Serial No. 521,640, filed March 11, 1931. It is important that the dispersion of rubber be of a uniform high purity, substantially if not entirely free from solid particles larger than can be suspended colloidally in the aqueous medium, and free also from air bubbles. In the event vulcanizing and compounding ingredients are admixed with the dispersion, the admixed materials should likewise be reduced to a minimum particle size. The dispersion flows through the nozzles into a coagulating bath 5 contained in container 6, from which it is conveyed by a suitable means such as an endless belt 7 to washing bath 8 in container 9. At this point the coagulated material may be transferred to a conveyor belt 10 which inaugurates its passage through the drying system which will now be described.

The drying system may consist in a series of continuous belts 10, 11 and 12 which carry the material through a closed container 13. The container may be provided with separate passages through which each belt may be moved. In such case each passage is supplied with a current of hot dry air by means of centrifugal blowers 14, suitably driven, which suck in the air through orifices 15 where a source of high heat, such as a large gas burner 16, may be positioned. Each passage is preferably supplied with drying air in such a manner that the air current is counter to the movement of the belt upon which the rubber material has been deposited, the course of hot air travel being indicated by the arrows in Figs. 1 and 2. The openings through which the drier belts enter and leave the drier casing are operative to permit the escape of enough moisture-laden air to keep the humidity at a sufficiently low level for proper evaporation. The volume of water to be removed from the thread is very small compared with the volume of the drier casing, so that the continuous removal of a small proportion of the air suffices to keep the humidity low. This air is continuously replaced by fresh air which comes in through the burner openings, as shown in Fig. 2 of the drawing. The fresh air thus supplied is sufficient to expel a substantial stream of moist air through the openings for the belts. The belts 10, 11 and 12 may be connected to a source of power such as motor M which drives variable speed gears 17 and transmits the desired motion at the desired rate of speed to the belts by means of pulleys 18 and belt 19. During its travel in the drier the films or filaments of aqueous rubber dispersion are substantially completely dried, the aqueous content being absorbed and/or evaporated by the hot drying gases. Satisfactory drying temperatures may be from 180° to 300° F., it being essential however, that the temperature in the dryer be gradually or progressively increased from a minimum at the end adjacent the coagulating bath to a maximum at the end adjacent the vulcanizer.

Emerging from the drier, the threads, in substantially completely dry condition, may be laid on a belt 20 which carries them through a vulcanizing apparatus designated at 21. This may consist of an outer shell 21 provided with an inner shell 22 in which diametrically opposite rows of perforations 23 may be provided. To the space 54 between the outer and inner shells is supplied a hot inert gas such, for example, as superheated steam, which may be obtained by conducting a quantity of steam through a pipe 50 which leads through coil 51 in a suitable superheater 52 and whence the pipe may be directed, through suitable valve control means 53, into the chamber 54. The superheated gas passes from the jacket 54 through perforations 23 and is distributed in the inner tube 22 of the vulcanizer. The temperature of the steam may be regulated by means of a thermometer having its bulb 24 inside the jacket 54 and associated with the electrical or thermostatic valve control means (not shown) which may be arranged to regulate the gas supplied to the superheater so that the temperature of the inert gas may be maintained at a constant and predetermined value. On emerging on the belt 20 the vulcanized rubber material may be wound on a suitable carrying reel 27.

During processing the formed material, for instance rubber thread, emerges from the coagulating bath and is washed and placed immediately upon the drier where drying conditions are adjusted so that a maximum drying is accomplished. As above indicated it is essential that the aqueous dispersion of rubber which is used must be of uniformly high quality and should preferably be free from solid compounding materials in other than a state of fine subdivision and suspension, whereby the drying operation may be accomplished without "blowing" and without appreciable distortion or variation in the uniform quality and shape of the thread as originally formed, so that all portions thereof may be delivered to the vulcanizer in uniformly dried condition. In this condition the rubber is ready for vulcanizing, which is preferably accomplished by passing the same as shown through a horizontally disposed vulcanizing apparatus as shown where the material 28 is vulcanized at atmospheric pressure in the superheated gas, at relatively high vulcanizing temperatures. Temperatures between 325°–400° F. may be used, depending on the compound to be vulcanized and other conditions, although in some instances we may find it desirable to use temperatures of 500° F. or over. After vulcanizing the material is of course ready for winding or handling preparatory to shipment.

Suitable compounding ingredients such as sulphur for vulcanization, accelerators, fillers, pigments, anti-oxidants, etc. may be incorporated, preferably in a state of fine subdivision, in the aqueous dispersion used. As an accelerator we prefer rapid organic accelerators, although it may not be expedient to use the so-called ultra accelerators. A slight or initial setting up in the dried filaments apparently occurs in the drier, when rapid accelerators are used, so that the material is hard and compact enough for treatment in the vulcanizer without resulting in a softening action to an extent which would render the material tacky and sticky under the vulcanizing heat. The presence of an anti-oxidant ensures against too great a tackiness and consequent trouble in sticking to the carrying means, and may assist the setting-up of the product.

It should be noted that the vulcanizing temperatures used in the present process are considerably higher than the normal vulcanizing temperatures employed in the production of rubber articles. This is accomplished at atmospheric pressure through the medium of the inert gas, thus enabling the vulcanizing step to be carried on continuously and quickly and without oxidation. In general the time of vulcanization of a given compound may be cut in half by elevating the temperature of vulcanization approximately 13° F. As normal vulcanizing temperatures are between 280–300° F. it can be seen that by raising such temperature for instance to between 325–400° F. the time for vulcanization may be reduced to from $1/8$ to 1/100 of the normal time which would be required. Thus by using suitable compounding ingredients and accelerators of vulcanization in conjunction with superheated steam, for example, it is possible to accomplish vulcanization of particular compounds in very short periods of time, and such result may be accomplished by the use of a relatively small and lightly constructed vulcanizer such as that illustrated. Rubber material suitably conditioned for vulcanization may be passed continuously through such a vulcanizing apparatus and transformed during its passage, into completely vulcanized state. It can be readily seen that we have thus devised a method of the utmost commercial significance by which rubber articles may be continuously made, and quickly and efficiently vulcanized without any break in the manufacturing operation.

In the place of steam a more permanent gas may be used, that is a gas which is in vapor form at ordinary atmospheric pressure and temperatures, such as carbon dioxide, nitrogen or ammonia.

Ordinary practice has shown that rubber stocks if heated suddenly to very high temperatures at atmospheric pressures invariably "blow" due to the fact that the rubber material, especially milled compounds, generally contains free air and in addition often contains vaporizable or expansible materials, which when subjected to high heats expand to a considerable degree. With this invention rubber material is so conditioned that it contains substantially no free air and is so treated that there is a minimum formation of vapor in the rubber mass and expansion of portions thereof. It is thus capable of being heated to high temperatures without blowing or distortion, though, of course, there may be manifested a uniform shrinkage which naturally occurs in cooling rubber material or by virtue of the removal of the aqueous content from an aqueous dispersion. It can be seen that an essential feature of the invention is to gradually or progressively heat a rubber composition to a high temperature culminating in complete vulcanization, thus ensuring against sudden vaporization of liquid particles or the sudden formation of gases, all of which would tend to produce "blowing" under high heat and a consequent deleterious effect in the quality of the product.

Rubber articles such as sheets and tubes, especially those constructed of pure rubber compounds and made in the form of thin tubes, strips or sheets may also be continuously vulcanized by the use of the principles herein set out. The invention is to be understood as not being limited to the illustrative forms set out in this application nor in any manner other than by the present state of the art.

Having thus described our invention, what we claim and desire to protect by Letters Patent is:

1. The process of making an article comprising a continuous length of rubber material which comprises forming an article comprising a continuous length of the solids deposit of an aqueous dispersion of rubber containing vulcanizing ingredients, concurrently drying and at least slightly setting up the same by subjecting it to progressively increasing temperatures under evaporative conditions, and completing the vulcanization of the same at a temperature reaching at least 325° F.

2. The process of making an article comprising a continuous length of rubber material which comprises forming an article comprising a continuous length of the solids deposit of an aqueous dispersion of rubber containing vulcanizing ingredients, concurrently drying and at least slightly setting up the same by subjecting it to progressively increasing temperatures under evaporative conditions, and completing the vulcanization of the same in a gas at atmospheric pressure at a temperature of at least 325° F.

3. The process of making an article comprising a continuous length of rubber material which comprises forming an article comprising a continuous length of the solids deposit of an aqueous dispersion of rubber containing vulcanizing ingredients, passing the same through progressively increasing temperatures to concurrently dry and at least slightly set up the same, and passing the dried article through a gaseous atmosphere at a temperature reaching at least 325° F. to complete the vulcanization of the same.

4. The process of making rubber thread which comprises forming a continuous length of the solids deposit of an aqueous dipersion of rubber containing vulcanizing ingredients and continuously drying the same under evaporative conditions and concurrently at least slightly setting up the same, and completing the vulcanization of the same at a temperature reaching not less than 325° F.

5. The process of making rubber thread which comprises forming a continuous length of the solids deposit of an aqueous dispersion of rubber containing vulcanizing ingredients and continuously drying the same at progressively increasing temperatures under evaporative conditions, and concurrently at least slightly setting up the same, and completing the vulcanization of the same in a gaseous atmosphere at a temperature reaching at least 325° F.

6. The process of making rubber thread which comprises streaming an aqueous dipersion of rubber containing vulcanizing ingredients into a coagulant, removing the coagulated stream from the coagulant, passing the same through progressively increasing temperatures under evaporative conditions to concurrently dry and at least slightly set up the same, and passing the dried thread through a gas at a temperature reaching at least 325° F. to complete the vulcanization of the same.

WILLIS A. GIBBONS.
EARL G. STURDEVANT.